United States Patent [19]
Rosso

[11] 3,996,800
[45] Dec. 14, 1976

[54] TURBINE METER

[75] Inventor: John B. Rosso, Tulsa, Okla.

[73] Assignee: Combustion Engineering, Inc., Windsor, Conn.

[22] Filed: May 17, 1974

[21] Appl. No.: 470,891

[52] U.S. Cl. .............................................. 73/231 R
[51] Int. Cl.² ......................................... G01F 1/00
[58] Field of Search ............ 73/231 R, 229, 231 M

[56] References Cited
UNITED STATES PATENTS

| 3,731,533 | 5/1973 | Geery | 73/231 R |
| 3,802,261 | 4/1974 | Zimmerman et al. | 73/231 R |
| 3,890,837 | 6/1975 | Frizzell et al. | 73/231 M |

FOREIGN PATENTS OR APPLICATIONS

| 1,433,462 | 2/1966 | France | 73/231 M |

Primary Examiner—William D. Martin, Jr.
Assistant Examiner—Willis Little
Attorney, Agent, or Firm—Arthur L. Wade

[57] ABSTRACT

The blades of a turbine meter are shown cutting the lines of force generated by a plurality of electromagnetic pick-up units positioned about the circle of blades. The pick-up units are connected in an electric network which amplifies, shapes and multiplies the voltage pulses generated by the blades and pick-up units and then combines the pulses into a single train representing the fluid flowing through the turbine meter.

3 Claims, 2 Drawing Figures

TURBINE METER

BACKGROUND OF THE INVENTION

1. Field of the Invention

The present invention relates to adapting turbine meters to proving, or calibrating, field meters which are on more or less continuous duty. More specifically, the turbine meter is structured to generate enough voltage pulses per volume of fluid passing through the meter to be dependably used to periodically calibrate field meters.

2. Description of the Prior Art

The low-maintenance, low-pressure drop, turbine meter has steadily gained the confidence of industry. The accuracy of turbine meter designs has been improved enough to justify the use of these meters in calibrating field meters which measure fluid flow.

However, there has been a severe limitation on the use of the turbine meter for proving field meters which measure the fluids produced from oil wells. The turbine meter, with its limited number of blades and single electromagnetic pick-up, generates far too few pulses per barrel to provide the resolution required for providing field meters. A minimum of 10,000 pulses per barrel is usually required.

The number of blades which can be added to the turbine meter rotor is limited by the desirable pressure drop through the blades. For example, the three inch, one pick-up, turbine meter generates in the order of 2,100 pulses per barrel of fluid through the meter. Of course, this number of pulses is far below the minimum of 10,000 pulses per barrel required to give satisfactory resolution for providing or calibrating, field meters. The resolution of this meter should be increased by a factor of 6, and the present invention provides this increase.

SUMMARY OF THE INVENTION

A principal object of the invention is to generate at least 10,000 pulses per barrel of fluid flowed through a turbine meter.

Another object is to provide multiple pick-up structures on a turbine meter and combine the voltage pulses of all pick-ups into a single train to represent fluid flow through the meter.

Another object is to provide an electronic network in which the voltage pulses of the train are multiplied until they provide the desired resolution of pulses per barrel of fluid flowed through the meter.

The present invention is embodied in a turbine meter having the pulses of rotor blades which will provide an allowable pressure drop through the meter and a plurality of electromagnetic pick-ups positioned at the tips of the blades. The pick-ups are connected in an electric network which is arranged to amplify, square and multiplied to provide the number of pulses which will give a desired resolution of the units of fluid through the meter. The multiplied pulses are then combined into a single train and registered as a quantity Other objects, advantages and features of this invention will become apparent to one skilled in the art upon consideration of the written specification, appended claims, and attached drawings, wherein;

FIG. 1 is a diagrammatic drawing of a complete system including a turbine meter rotor with pick-ups generating voltage pulses for a single train and embodying the present invention; and FIG. 2 is a diagrammatic drawing of the circuit of the doubler section of the FIG. 1 circuit.

DESCRIPTION OF THE PREFERRED EMBODIMENT

Figure 1:
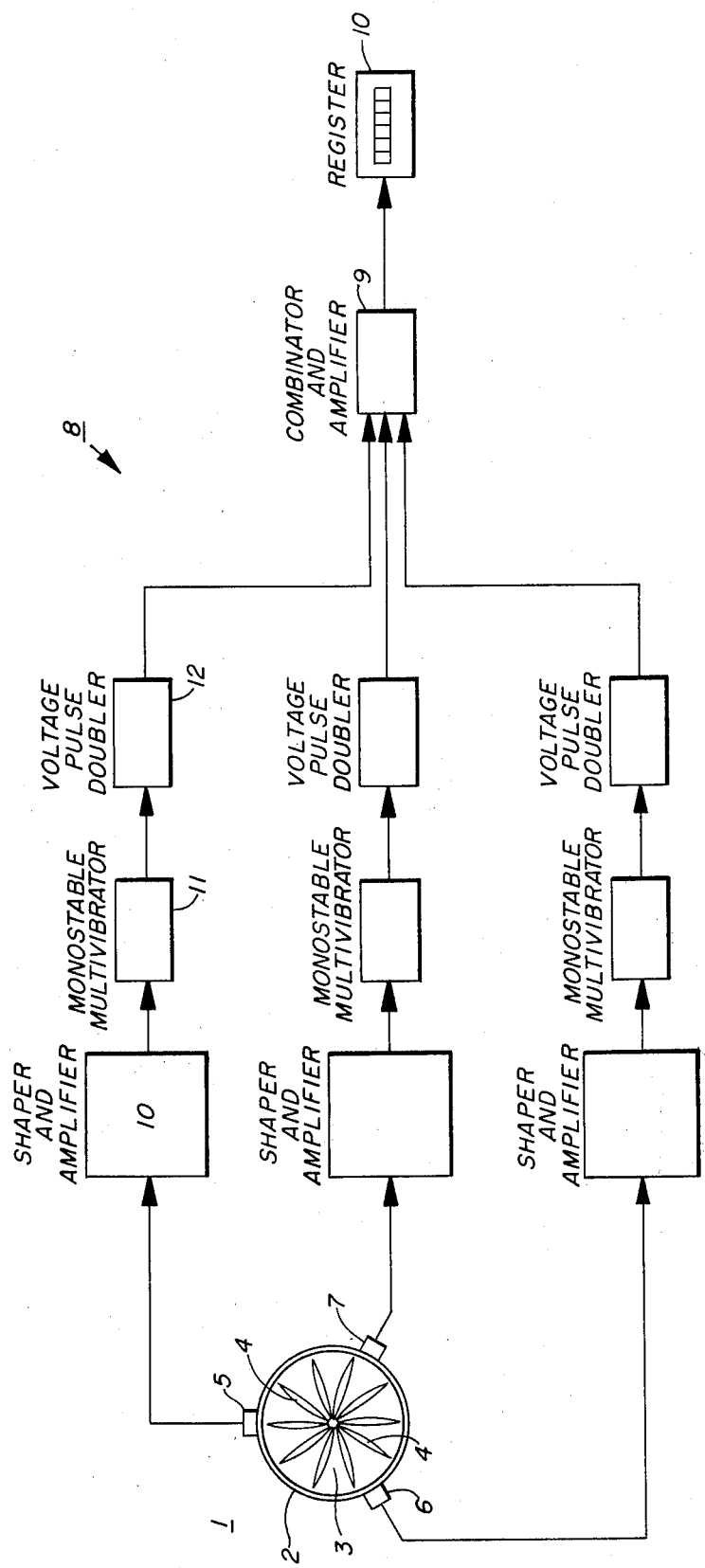

Referring to FIG. 1, there is shown a representation of the turbine meter 1. Body 2 has mounted in it a rotor 3 with blades 4. Blades 4 are engaged by the fluid passing through the body 2 to result in rotation of rotor 3.

The blades cut lines of electromagnetic force generated by pick-ups 5, 6, and 7. Cutting the lines of force generate pulses of voltage which are transmitted from each pick-up. These voltage pulses are given equal amplitudes, equal widths and then multiplied by circuit 8. Finally, the pulses are combined in a single train and given any further amplification necessary to actuate a counter.

Circuit 9 receives the pick-up pulses and processes and combines them for registration as the quantification of fluid flow through meter body 2. There are several different specific arrangements of circuit 9 which will produce a single train of pulses. Therefore, the specific arrangement of FIG. 1 is not to be taken as a limitation of the invention.

Invention is in the concept of producing voltage pulses at a plurality of pick-up stations. Further, the output of each pick-up station is multiplied enough to give a desirable number of total pulses for each unit of fluid flowed through the meter. The pulses are brought together in a single train. With the resolution high enough, the turbine meter is a practical means with which to prove, or calibrate, field meters.

In FIG. 1 a form of circuit 8 is disclosed which was very practical and dependable. The general experience of the inventor determined the selection of this form.

Each output from the three pick-ups is separately shaped and doubled. The three outputs are then received by a combinator and amplifying circuit 9 which forms a single train and amplifies the pulses for actuation of register 10.

The first two sections of circuit 8 are regarded by this inventor as well-known arrangements for performing their particular processing of the voltage pulses. At least they have been frequently used by the inventor as "building blocks" in other circuits. The third section is considered unusual, so it is shown in detail with FIG. 2, to insure a complete disclosure.

Section 10 functions to amplify the series of voltage pulses coming to it and form them with a uniform height. The circuit section needs no description beyond this stipulation of its functions. It is simply given the legend on the drawing of an amplifier and shaper of voltage pulses.

Section 11 is that class of circuit known in the art as a monostable multivibrator. It is well-known for its function of receiving pulses of regular amplitude and generating an output of pulses of predetermined width. Therefore, the first two circuit sections process the pulses generated by the turbine meter pick-up to give all pulses the same desired height and width. The pulses are then prepared to be multiplied to provide the resolution required.

In FIG. 1, Section 12 is legended as a "doubler" circuit. This implies that the voltage pulses received from section 11 are simply split in two. In the FIG. 1 embodiment of the invention this is the function of section 12. Each of the output pulses from the three pick-ups are doubled. A three-inch turbine meter with a single pick-up and ten blades usually generates about 2,100 pulses per barrel of fluid flowing through the meter. If the outputs of three pick-ups were combined, there would be 6,300 pulses per barrel. Circuit section 12 doubles the pulses of each train from each pick-up. 12,600 pulses per barrel of fluid are generated, and this number of pulses is well within the range which will give an acceptable resolution in using the turbine meter as a prover of field meters.

If further resolution is desired - required, the stages of the doubler circuit 12 may be cascaded to multiply the number of pulses per barrel by numbers greater than two. However, the embodiment disclosed in FIG. 1 is adequate for the present purposes of meter proving.

Figure 2:
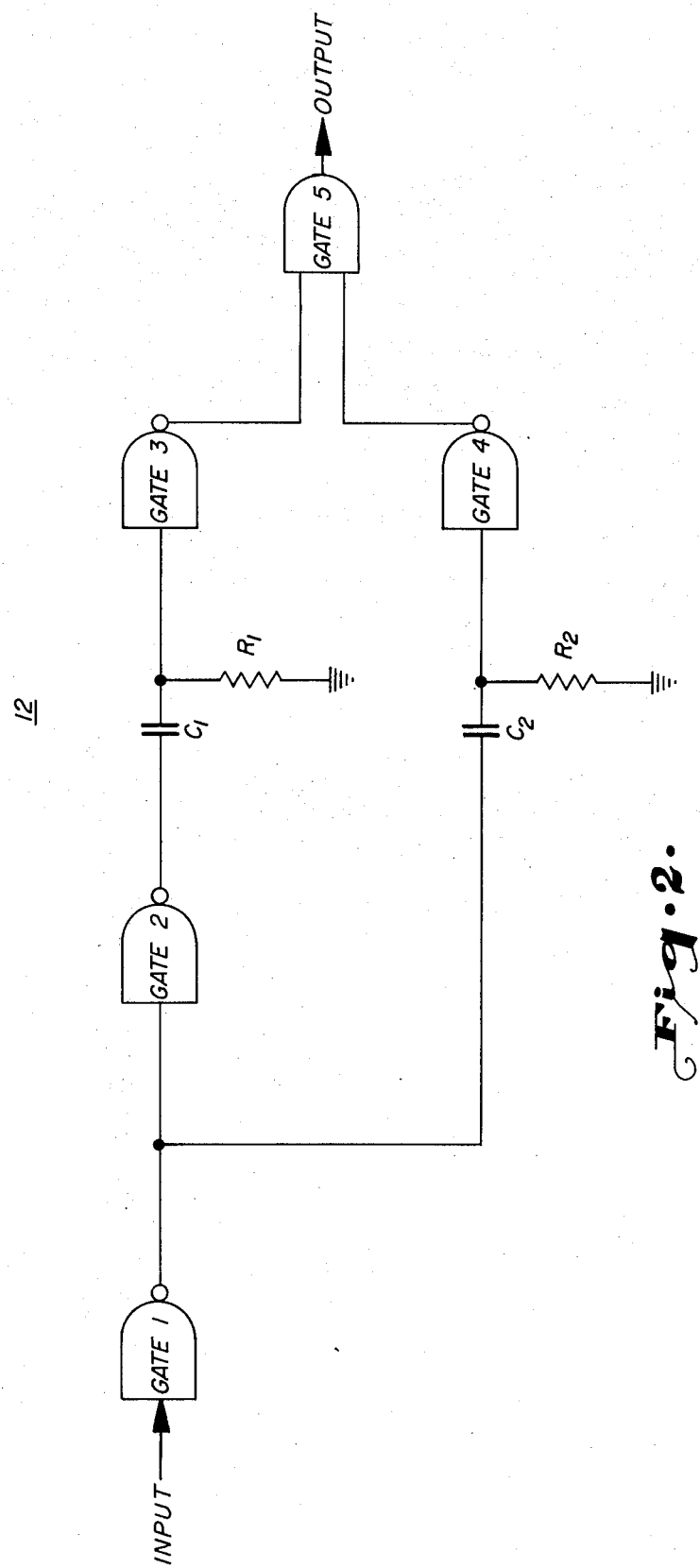

FIG. 2 is established to give the disclosure of the doubler section 12 is sufficient detail to enable one skilled in the art to construct it from available components. The basic building blocks of the section are so-called NAND GATES. These packages of transistors and resistors are commercially available for just such functions as desired in the present combination. The specifications and functional characteristics of these NAND GATES are tabulated in the catalogs of manufacturers. In FIG. 2, the five gates are given the accepted symbolic form and connected so as to provide a train of voltage pulses as an output which is twice the number of voltage pulses of their input train. In this manner, the resolution of the units of fluid passed through the meter is doubled, i.e. the number of voltage pulses representing a unit of fluid through the meter is multiplied by a factor of two.

It is conventional, in representing NAND GATES, to not show the leads with which a voltage source is connected to their circuit. Also, the ground connection is understood without being actually shown on the drawing. This leaves the drawing of FIG. 2 quite clear and simple. Each gate is shown with an input and an output.

The NAND GATE was developed for use in computer circuits. It has two states. These states are referred to as logic level 1 and logic level 0. In the embodiment of FIG. 2, the input to NAND GATE 1 at logic level 0 is designed to not exceed 0.3 VDC. When the input is at logic level 0 the output of NAND GATE 1 is at its logic level 1. The design of the circuit establishes this output at not greater than 5 VDC.

The output of gate 1 is connected directly to capacitor C2. Therefore, when the output of gate 1 is at logic level 1, capacitor C2 is charged to the output voltage of gate 1. The input of NAND GATE 2 is also connected to the output of gate 1 and is designed to have an output of logic level 0. Capacitor C1 is discharged, of course. With the inputs to gates 3 and 4 and logic level 0, their outputs are both of logic level 1. Both inputs to gate 5 being at logic level 1, the output of this gate 5 is at logic level 0. Thus, the circuit section of FIG. 2 is at its initial, no signal, condition.

The circuit of FIG. 2 is designed to establish an output pulse of voltage upon a change in voltage at its input. Therefore, for each pulse of voltage applied to its input there are two pulses of voltage generated as an output. Therefore, the input voltage pulses are doubled, i.e. with each input pulse there are generated two output pulses.

The generation of the output pulses begin with the leading edge of the input pulse. As the input to gate 1 goes to logic level 1, its output goes to logic level 0. Capacitor C2 discharges through resistance R2 and the output of gate 4 remains unchanged at logic level 1.

At the input to gate 2, the logic level 0 in the output of gate 1 causes the gate 2 output to go to logic level 1. This voltage applied to C1 causes C1 to charge through R1. The voltage developed across R1, due to the charging current, causes the input of gate 3 to go to logic level 1. The output of gate 3 switches to logic level 0. With one input to gate 5 at logic level 1 and the second at logic level 0, the output of gate 5 goes to logic level 1 for duration of the C1 - R1 charge time. This is the first voltage pulse generated by the FIG. 2 circuit section.

During the time the input pulse is applied to gate 1, no further action takes place.

At the trailing edge of the input pulse, the input to gate 1 falls to logic level 0. The output of gate 1 switches to logic level 1. Gate 2 output goes to logic level 0. C1 discharges through R1, and no change occurs in the output of gate 3. Gate 3 output remains at logic level 0.

At the same time, C2 changes through R2 to the output voltage of gate 1. The voltage developed across R2, due to the charging current, causes the input of gate 4 to go to logic level 1. The output of gate 4 switches to logic level 0. Again, with one input to gate 5 at logic level 1 (this time from gate 4) and the other input at logic level 0 (gate 3 output did not change) the output of gate 5 goes to logic level 1 for the duration of the C2–R2 charge time. Therefore, the second voltage pulse is generated by the trailing edge of the input pulse. Again, two voltage pulses have been generated by the one input voltage pulse.

The description of the function of the doubler circuit of FIG. 2 may be unnecessarily detailed. One skilled in the art my be familiar with how the circuit functions simply by examination of the drawings. However, it appears to the inventor that this one section of the circuit which may need more than reference to the type of circuit and its over-all function in producing twice the number of voltage pulses fed into its input.

Each pick-up 5, 6, and 7 is provided with this system to produce a train of pulses. Each train is fed into a circuit indicated at 9 so all trains of pulses may be combined to produce a single train of pulses which will represent the flow of fluid through turbine meter 1. These pulses are then fed into register 10 to give a visual display of the quantity of fluid passing through the meter. Of course, other uses can be made of the pulses. However, register 10 is adequate to support reference to manifestation of the fluid quantity metered.

Go back to sharper and amplifier units 10 and monostable multivibrator units 11. It was stated earlier that the circuits of these units are well known arrangements for processing voltage pulses. A recently issued patent will specifically demonstrate this fact.

Zimmerman et al. U.S. Pat. No. 3,802,261 issued Apr. 9, 1974 and discloses a fluid flow meter. A turbine flow meter is indicated as producing an alternating voltage output signal. This output is directed through a conventional shaper to provide a steep wavefront triggering pulse suitable for operating a monostable or one-shot multivibrator. The multivibrator produces an output pulse of fixed duration.

The description may vary from that of the present application, but it seems clear that the "shaper" and "MV one-shot" are treated as conventional building blocks. Further, these building blocks are specifically the same as units 10 and 11 of the present application.

With the conventional circuits, or units, of the disclosure understood, the invention is the more clearly seem. The novel system utilizes a turbine meter whose plurality of blades is, of course, limited. To produce the number of pulses required for resolution of the fluid units passing through the meter, the invention calls for a plurality of the electromagnetic pick-up units. A circuit then receives the pulses from all the pick-up units and combines them into a simple train in which there are the minimum of pulses required for each unit of fluid through the meter. This is the thrust of the teaching in which there is invention as defined by the claims.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention, having been described, what is claimed is:

1. A system utilizing a turbine meter for measuring fluid flow, including,
    a turbine meter having a plurality of blades arranged to be rotated from a common axis by fluid flow to be measured,
    a plurality of electromagnetic pick-up units positioned about the circle of the blade tips said plurality of blades intersecting magnetic lines of force generated by said pick-up units to produce pulses,
    a plurality of circuits corresponding in number to said plurality of pick-up units, each of said circuits connected to a corresponding one of said pick-up units to multiply said pulses and provide a predetermined total number of pulses per volume unit of fluid flowing through the meter,
    and means connected to the circuit of each pick-up unit to combine their multiplied into a single train and manifest the train quantitatively as the flow of fluid.
2. The system of claim 1 in which,
    there are three electromagnetic pick-up units positioned equal distances from each other about the circle of the blade tips.
3. The system of claim 1 in which,
    each circuit connected to each pick-up unit amplifies and squares the pulses before multiplying the pulses.

* * * * *